United States Patent [19]

Ferris

[11] 4,174,137

[45] Nov. 13, 1979

[54] CONTROL ROD ROLL-OVER LIMITER

[75] Inventor: Donald L. Ferris, Newtown, Conn.

[73] Assignee: The United States of America as represented by the Secretary of the Army, Washington, D.C.

[21] Appl. No.: 927,704

[22] Filed: Jul. 24, 1978

Related U.S. Application Data

[63] Continuation-in-part of Ser. No. 826,610, Aug. 22, 1977, abandoned.

[51] Int. Cl.² .................................................. F16C 9/06
[52] U.S. Cl. ................................ 308/72; 29/149.5 B; 416/140; 416/168 A
[58] Field of Search ........................ 403/113–116, 403/117, 157, 158, 159, 190, 149, 151, 225, 226, 122, 128, 131, 139, 143, 129, 124, 127, 125, 126; 308/72, 8, 15, 163–166, 161, 140, 237; 29/149.5 B; 416/168 R, 168 A, 140 A; 244/83 J

[56] References Cited

U.S. PATENT DOCUMENTS

| | | | |
|---|---|---|---|
| 2,380,150 | 7/1945 | Collito | 308/72 |
| 2,487,989 | 11/1949 | Sherburne | 403/122 |
| 2,753,225 | 7/1956 | Gilmer | 308/72 |
| 2,973,227 | 2/1961 | Glavan | 308/72 |
| 3,806,158 | 4/1974 | Casey | 308/72 |
| 3,992,066 | 11/1976 | McCloskey | 308/72 |

*Primary Examiner*—Douglas C. Butler
*Attorney, Agent, or Firm*—Nathan Edelberg; Norman L. Wilson, Jr.; Robert P. Gibson

[57] ABSTRACT

A stop device limits rods, such as control rods, used in helicopter flight control systems, from roll-over in selected directions, while allowing substantially unrestricted motion in other directions.

4 Claims, 5 Drawing Figures

CONTROL ROD ROLL-OVER LIMITER

This application is a continuation-in-part of my application Ser. No. 826,610 filed Aug. 22, 1977, now abandoned. The invention herein described was made under a government contract with the Department of the Army.

BACKGROUND OF THE INVENTION

Helicopter flight control systems and other apparatus frequently include control rods with self-aligning bearings at the rod ends, to transmit linear movements via the rods to bell cranks or other mechanisms. Typically, the bearings are spherical in order to provide uniform surfaces to receive thrusts moments from a number of directions. Such spherical bearings are usually retained in an aperture described by peripheral side portions of the rod end which surround the bearing and provide a bearing retention socket which describes a portion at least of a spherical cavity. The bearing can then move freely within the rod end, without becoming disengaged therefrom.

While providing for large angular control motions, such control rod-end structures may also allow motion in other directions to the extent that wear producing contact is made between primary rod-end structures. The devices of U.S. Pat. Nos. 2,487,989, 2,753,225 and 2,973,227 each have an inherent angular limit to the degree of roll-over which can occur. However, the limit is due merely to their construction, which precludes further angular rotation. For instance, if the rod is rotated about its longitudinal axis to its full extent, either the bearing race or the edge of the control rod will contact clevis. Such contact will produce wear degradation of those primary structural parts that could lead to rod end or clevis failure. There are no actual stop means preventing such contact.

Various attempts have been made to cope with this roll-over wear producing problem. Thus, it has been proposed to limit such rotational motion by machining a groove in the bearing face to receive a corresponding "tongue" formed on the inside of the bearing race. In this connection, reference is made to Johnson, U.S. Pat. No. 3,401,964. Another proposal is to provide an inner race having a flanged end for the spherical inner bearing race, so as to limit rotational motion by contact between the flange and an oblong inner peripheral surface machined in the outer bearing race. In this connection, reference is made to Sowatzke, U.S. Pat. No. 3,510,178. Other proposals include circumferential groove-pin, or abutment stop means for limiting rotational motion of spherical journal bearings while allowing other required motions. In this connection, reference is made to Pickering and Stitzinger, U.S. Pat. Nos. 185,188 and 1,562,130 respectively. Such prior art proposals have the disadvantage that they involve modifications to the bearings themselves. As a result of contact and resultant wear, the bearing may become weakened, with consequent limitations on the loads it may be able to withstand before failure. The bearings would also be special order bearings rather than stock items, leading to added cost and inconvenience.

SUMMARY OF THE INVENTION

This invention provides a means for limiting undesired roll-over of control rods of the type having an aperture through the rod end with an annular perimeter in which is secured a self-aligning bearing. The bearing is in the form of a ball having a shaft therethrough locked in a race in the aperture. The roll-over stop means includes a boss member positioned on the portion of the rod end that forms the perimeter of the aperture. The boss member is adapted for abutment with a clevis to which the rod end is attached. This limits roll-over movement. It will, however, permit unrestricted motion and misalignment in selected directions. The stop means meeting the foregoing objectives will not lead to derogation of the strength of the bearing as the boss wears.

DESCRIPTION OF DRAWINGS

This invention may be understood from the description which follows, and from the drawings which form part of this application in which.

DESCRIPTION OF PREFERRED EMBODIMENT

Figure 1:
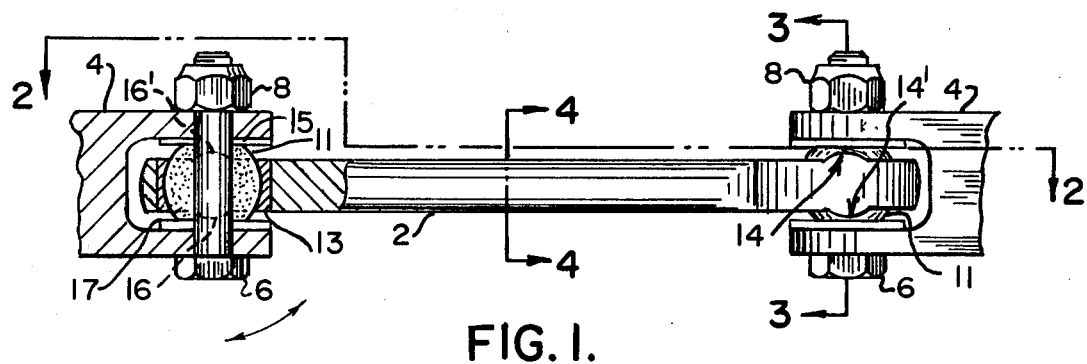
FIG. 1 is a side view partially in section of an embodiment of this invention.
Figure 2:
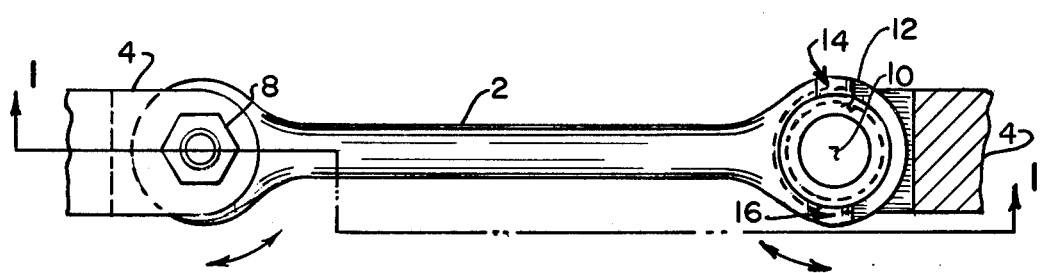
FIG. 2 is a top view partially in section of the embodiment of the invention.

Referring first to FIG. 1 there is shown a side view of a control rod taken through 1—1 of FIG. 2. FIG. 2, taken through 2—2 of FIG. 1 shows features not visible in FIG. 1. A motion rod 2, such as a control rod, damper piston, or the like is shown. Each end of control rod 2 is provided with an opening (FIG. 2) for a self-aligning spherical bearing 10 of the known type. Bearing 10 is secured in an aperture having an annular perimeter 12 adapted to receive such a self-aligning bearing.

The self-aligning bearing is best shown in FIG. 1. A ball 11 is rotatably retained within race 13 locked in the aperture. As is known ball 11 is provided with a central opening or shaft through its center. In order to connect the control rod end to other apparatus to which motion is to be imparted a clevis 4 is employed. A bolt 6 extends through the clevis and the shaft in ball 11 and by nut 8 or other means the bearing is held in place as can be seen in FIG. 1.

Figure 4:
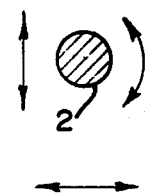
FIG. 4 is a view taken through 4—4 of FIG. 1.

In order that the invention may be better understood reference is now made to FIG. 4 which is an end view of control rod 2 taken through 4—4 of FIG. 1. The directions of movement permitted a control rod of this type are shown in the figure. Normally a control rod is permitted movement about its lateral axis, indicated by the horizontal arrow, movement about its translated axis, indicated by the vertical arrow, and movement about its longitudinal axis, indicated by the arcuate arrow. The only limitations to the degree of movement in these directions have been the inherent limitations due to the construction of the bearing. The primary structural members may thus be considered limits in all control rods, for instance where the rod end contacts the clevis, or the race contacts the connecting bolt.

There are, however, times when it is necessary, or at least desirable, to protect the primary structures from the effects of contact produced wear. This invention provides such means. In the sense that the inherent constructions of the bearing are primary stop means, the roll-over stop means provide herein are secondary stop means. The secondary stop means can best be seen in FIGS. 1 and 2. Mounted on the end of control rod 2 adjacent the bearing retaining aperture are boss members 14 and 16 (FIG. 2).

Figure 3:
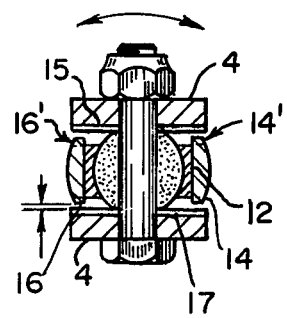
FIG. 3 is an end view taken through 3—3 of FIG. 1.

FIGS. 1 and 2 illustrate a so-called "one-piece construction", i.e., one in which the protuberances or knurls 14, and 16 are formed at the same time as rod 2 and integrally therewith, as by drop-forging, machining, or other known per se methods for forming and/or working metal or other materials from which rod ends advantageously may be made. It will be clear, however, that embodiments of this invention might also include bosses to be affixed to the rod ends, rather than being formed integrally therewith. It should be noted that each of the bosses 14, 16, described roughly a segment of a circle, in which the chord is the juncture of the boss with the portion of the rod end forming the periphery of the bearing aperture, and the center of circle is coincident with the center of the ball of the bearing. Generally speaking a plane through the boss is substantially parallel to the longitudinal axis of the control rod. Bosses 14, and 16 are also so disposed that the plane therethrough is substantially perpendicular to the lateral control rod axis. This is shown more clearly in FIG. 3. FIG. 3 also shows roll-over element 16 on the opposite side of the aperture from element 14.

In addition to bosses 14 and 16 across the aperture from each other as shown in FIG. 2, for reasons which will be apparent, similar bosses 14' and 16' can be incorporated into the peripheral portion of the rod end on the other side thereof as shown in FIG. 3. Thus four bosses, 14, 14', 16 and 16' are preferably configured as described, in order to maintain the same degree of roll-over limiting regardless of superimposed motions of the rod in other directions. In addition, positioned in the inside of clevis 4 are wide, flat washers, 15 and 17 (FIG. 3) for the purpose of presenting sacrificial wear-bearing surfaces to the roll-over bosses 14 and 16. Bonded washers are preferred to integral wear surfaces. The objective is to provide additional or secondary material, which may be worn away without jeopardizing the bearing strength.

Figure 5:
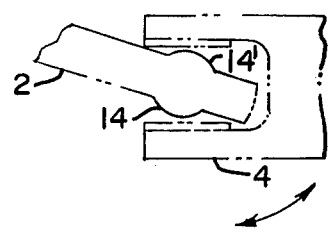
FIG. 5 is a phantom view of an embodiment of the invention.

Considering now the operation of the control linkage assembly, as indicated, FIG. 4 illustrates the types of motion which the rod 2 may exhibit relative to the clevis 4 by movement about the surface of the bearing. Movement about the translated and lateral axes (vertical and horizontal arrows in FIG. 4) is limited only by the construction of the control linkage assembly. However in accordance with the practice of this invention rotation of the connecting rod is restricted about its longitudinal axis (i.e. in either of the directions indicated by curved arrow in FIG. 4), while leaving it free to pivot about the spherical bearing into any of a myriad of other positions, permitted especially by the circular boss configuration. See FIG. 5.

The operation of the invention can best be seen in FIG. 3. As the control rod is rotated about its longitudinal axis, the bosses diagonally across from each other 14 and 16' or 16 and 14' are brought into abutment with the washers 15 and 17. Because the roll-over stop members each have outer surfaces each of which is described by a portion of a circle with its center coincident with the center of the ball of the bearing, roll-over contact of primary members is effectively prevented, regardless of where in angular displacement the rod is positioned.

Repeated contact of my stop means will result in wear of the boss and/or washer, whichever is softer. No degredation of the rod end will occur until such stop means is completely worn away.

Although the embodiment heretofore described comprises four roll-over stop bosses, it should be understood that roll-over in either direction may also be effectively prevented by having only two roll-over stop members positioned on only one side of the aperture, or on only one side of the portion of the rod end which forms the periphery of the aperture; the effect of such a reduction being merely to halve the roll-over inhibiting contact surface. Additionally, other embodiments might include only one such member, or two members of which one each is on the opposite side of the aperture and on the opposite side of the aperture-forming peripheral portion where, for example, it is desired to restrict rod-roll in only one direction.

Thus, it is to be understood that the embodiments herein depicted and discussed are by way of illustration and not of limitation, and that a wide variety of embodiments may be made without departing from the spirit or scope of this invention.

What is claimed is:

1. In a control linkage assembly including a control rod with an end provided with an aperture therethrough having an annular perimeter, a spherical bearing within said aperture in the form of a race and a ball with a shaft thru its center rotatably retained within said race, and a clevis secured to the control rod end by a bolt thru said shaft, roll-over stop means comprising a boss member mounted on the control rod end adjacent the aperture for abutment with the clevis to limit movement of the control rod about its longitudinal axis, said boss member being in the form of a segment of a circle disposed in a plane substantially parallel to the longitudinal control rod axis, but perpendicular to the lateral control rod axis with the circle center coincident with the center of the ball of the bearing to permit a full range of control rod movement about its translated and lateral axes.

2. The device of claim 1 wherein said roll-over stop means comprises at least two such members, of which one each is on the opposite side of said aperture from, but on the same side of said portion of said rod end as, the other.

3. The device of claim 1 wherein said roll-over stop means comprises at least two such members, of which one each is on the opposite side of said portion from, but on the same side of said aperture as, the other.

4. The device of claim 1 wherein said roll-over stop means comprises at least four such members grouped into two pairs, one member in each pair being on the opposite side of said portion from the other member of said pair, and each of said pairs being on the opposite side of said aperture from the other of said pairs.

* * * * *